US007292321B2

(12) United States Patent
Yamamoto et al.

(10) Patent No.: US 7,292,321 B2
(45) Date of Patent: Nov. 6, 2007

(54) CONTACT DETECTION SENSOR AND CONTACT DETECTION METHOD

(75) Inventors: Yoshiharu Yamamoto, Toyonaka (JP); Michihiro Yamagata, Osaka (JP); Katsuhiko Hayashi, Katano (JP); Hiroshi Yamaguchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 216 days.

(21) Appl. No.: 11/115,384

(22) Filed: Apr. 27, 2005

(65) Prior Publication Data

US 2005/0270182 A1 Dec. 8, 2005

(30) Foreign Application Priority Data

Apr. 27, 2004 (JP) ............................. 2004-131769

(51) Int. Cl.
*G06K 9/74* (2006.01)

(52) U.S. Cl. ......................................... 356/71; 235/454

(58) Field of Classification Search ................... 356/71
See application file for complete search history.

(56) References Cited

U.S. PATENT DOCUMENTS

2003/0133098 A1 * 7/2003 Hoshino et al. .............. 356/71

FOREIGN PATENT DOCUMENTS

| | | |
|---|---|---|
| JP | 2003-240904 | 8/2003 |
| JP | 2004-012640 | 1/2004 |

* cited by examiner

*Primary Examiner*—Roy M. Punnoose
(74) *Attorney, Agent, or Firm*—McDermott Will & Emery LLP

(57) ABSTRACT

A low-cost contact detection sensor and contact detection method for easily detecting a contact by a third party is provided. A contact detection sensor comprises an antireflection structure including structure elements having a predetermined shape which are put in an array periodically at a pitch smaller than a wavelength of visible spectrum; and a substrate including the antireflection structure in at least a part of a surface portion thereof. The antireflection structure distinguishes whether the detection target is contacted by a human body or not based on a change in reflectance which occurs to an area of the detection target contacted by the human body when the detection target is contacted by the human body.

26 Claims, 11 Drawing Sheets

CONTACT DETECTION SENSOR AND CONTACT DETECTION METHOD

BACKGROUND OF THE INVENTION

1. Field of the Invention

The present invention relates to a contact detection sensor and a contact detection method for detecting a contact, and more specifically to a contact detection sensor and a contact detection method for detecting a contact by a third party.

2. Description of the Background Art

Recently, as the crime rate increases, there have been a greater number of thefts of banknotes and credit cards. In order to prevent unauthorized use of stolen banknotes and credit cards, a procedure for suspending use thereof needs to be quickly taken.

Japanese Laid-Open Patent Publication No. 2003-240904 discloses an antireflection object capable of promoting the light reflectance reduction caused by microscopic irregularities provided on a surface thereof and improving the display visibility.

In actuality, however, it occasionally occurs that the owner of the banknote or credit card does not notice it stolen until some time later. The banknotes and credit cards are often kept in a safekeeping holder or the like. When the banknote or credit card is taken away from the safekeeping holder, the owner cannot notice it stolen immediately. When the owner does not notice it stolen for quite a while, monetary damages may be caused; for example, cash may be illegally withdrawn from the bank account using the banknote, or the credit card may be illegally used.

When a banknote or credit card is forged, it takes the owner more time to notice the illegal use thereof than the case where it is stolen. A malicious third party temporarily obtains a banknote or credit card illegally and reads information recorded thereon to make a copy. In this case, even after the banknote or credit card from which the information has been read is returned to its original place, the third party can illegally use the copied information. Therefore, the owner is more unlikely to notice the damages.

In order to allow the owner to notice a banknote or credit card stolen in a shorter period of time, means is needed for checking if a third party contacted the banknote, the credit card or the safekeeping holder used for keeping the banknote or the credit card.

One conceivable method for checking if a third party contacted a banknote or credit card is to install a security device such as, for example, a monitoring camera. However, this method is costly and, is not effective for the case where the owner carries a banknote or credit card.

Another conceivable method is to paste a seal on the safekeeping holder of a banknote or credit card. Japanese Laid-Open Patent Publication No. 2004-12640 discloses a one-way seal, which cannot be pasted back once released. In the case where the one-way seal disclosed in the above-identified publication is pasted on the safekeeping holder, the owner can immediately notice if a third party opened the safekeeping holder. However, the seal cannot be used as pasted on a banknote or credit card itself for the purpose of detecting that a third party contacted the banknote or credit card. Like the monitoring camera, this method is not effective for the case where the owner carries the banknote or credit card without a safekeeping holder.

Moreover, the one-way seal described in Japanese Laid-Open Patent Publication No. 2004-12640, when pasted on an envelope or the safekeeping holder mentioned above, can be used to check if the envelope or the safekeeping holder was opened or not, but cannot be used to confirm that no third party contacted the target having the one-way seal pasted thereon. Recently, many illegal acts regarding food sale have been revealed. For example, false representations are shown regarding the place of origin, materials and additives. In such illegal acts, food itself or materials are replaced, or labels are replaced, for example. Under the circumstances, there is an increasing demand for means for proving that no third party contacted the target. As described above, however, the one-way seal described in Japanese Laid-Open Patent Publication No. 2004-12640 cannot be used to confirm that no third party contacted the target.

SUMMARY OF THE INVENTION

Therefore, an object of the present invention is to provide a low-cost contact detection sensor and contact detection method for easily detecting a contact by a third party.

The present inventors found that an antireflection function described in, for example, Japanese Laid-Open Patent Publication No. 2003-240904 is applicable to a contact detection sensor for solving the above-described problems. A novel concept for achieving the above-described object is a contact detection sensor for distinguishing whether a detection target is contacted by a human body or not, the sensor comprising an antireflection structure including structure elements having a predetermined shape which are put in an array periodically at a pitch smaller than a wavelength of visible spectrum; and a substrate including the antireflection structure in at least apart of a surface portion thereof. The antireflection structure distinguishes whether the detection target is contacted by a human body or not based on a change in reflectance which occurs to an area of the detection target contacted by the human body when the detection target is contacted by the human body.

Another novel concept for achieving the above-described object is a method for distinguishing whether a detection target is contacted by a human body or not, the method comprising the steps of locating an antireflection structure, including structure elements having a predetermined shape which are put in an array periodically at a pitch smaller than a wavelength of visible spectrum, on at least part of the detection target; and distinguishing whether the detection target is contacted by a human body or not based on a change in reflectance which occurs to an area of the detection target contacted by the human body when the detection target is contacted by the human body.

According to the contact detection sensor and the contact detection method described above, a contact by a third party can be easily detected at low cost.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the present invention will be described more specifically with reference to the attached drawings.

First Embodiment

Figure 1:
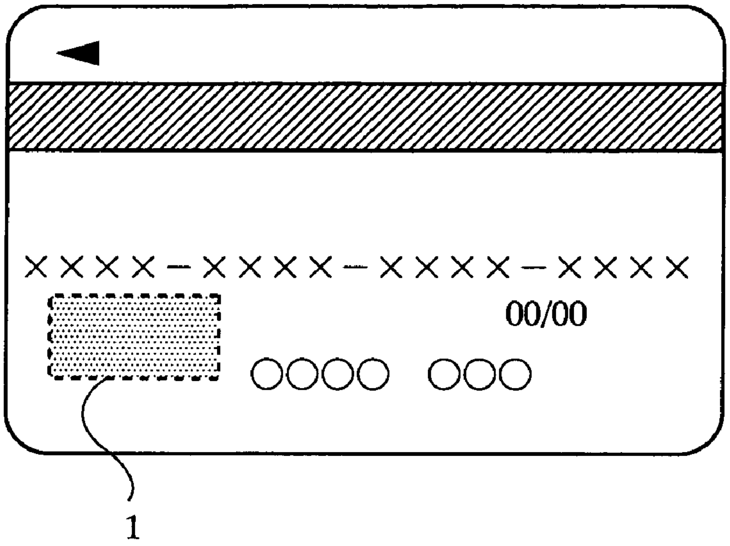
FIG. 1 shows an exemplary application of a contact detection sensor according to a first embodiment of the present invention.

FIG. 1 shows an exemplary application of a contact detection sensor according to a first embodiment of the present invention. FIG. 1 shows a magnetic card on which the contact detection sensor is provided. The magnetic card shown in FIG. 1 is a cash card, a credit card, an ID card or the like, and has information having a risk of being illegally used recorded thereon. On at least a part of a surface of the magnetic card, a contact detection sensor 1 is provided.

Figure 2:
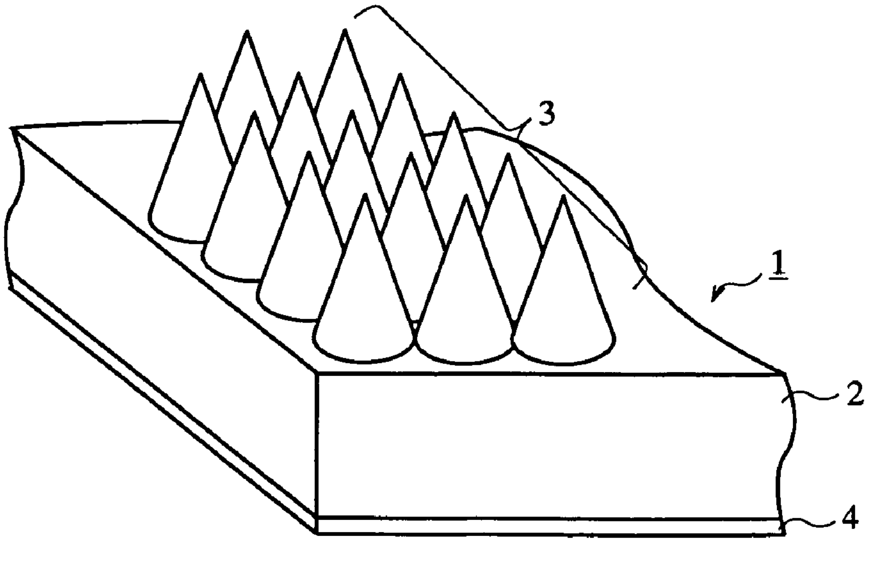
FIG. 2 is an enlarged schematic perspective view of a part of the contact detection sensor 1 shown in FIG. 1.

FIG. 2 is an enlarged schematic perspective view of a part of the contact detection sensor 1 shown in FIG. 1. The contact detection sensor 1 shown in FIG. 2 includes a substrate 2 and an adhesion layer 4.

The substrate 2 is a sheet formed of a transparent material such as, for example, an acrylic resin, a polycarbonate resin, or a polyethylene terephthalate resin. The substrate 2 includes an antireflection structure 3, which is a contact detection section, in at least a part of a surface portion thereof. The substrate 2 may have any thickness which allows the substrate 2 to be easily handled and provides a sufficient mechanical strength. Preferably, the thickness of the substrate 2 is equal to or greater than 0.05 mm. For example, the substrate 2 may have a size of 10 mm×20 mm×0.05 mm. Structure units of the antireflection structure 3 are, in actuality, very small as compared to the thicknesses of the substrate 2 and the adhesion layer 4, although the structure elements of the antireflection structure 3 are shown in the figure in an enlarged manner.

The adhesion layer 4 is formed on a rear surface of the substrate 2, i.e., on a surface opposite to the surface having the antireflection structure 3 provided thereon. The adhesion layer 4 is formed of, for example, an acrylic adhesion material, a rubber-based adhesion material, or an oily gel-based adhesion material. The contact detection sensor 1 is pasted on the magnetic card via the adhesion layer 4. Until the contact detection sensor 1 is used, it is usually preferable to put release paper (not shown) on the surface of the adhesion layer 4 for protecting the adhesion layer 4.

The antireflection structure 3 is formed of the structure elements having a predetermined shape which are put in an array periodically at a pitch smaller than a wavelength of visible spectrum (for example, 400 nm to 700 nm). Preferably, the pitch of the structure elements is smaller than the shortest wavelength of visible spectrum. By putting structure elements having a predetermined shape in an array periodically in this manner, the apparent refractive index with respect to visible light can be continuously changed. As a result, an antireflection surface can be formed which has a transmission/reflection characteristic, at an interface with air, which has less dependency on the angle of incidence and less dependency on the wavelength.

In the case where the antireflection structure 3 is formed of a two-dimensional arrangement of a great number of microscopic structure elements, the "pitch" means a pitch in a direction in which the structure elements are arranged most densely.

The antireflection structure 3 is a member having a microscopic structure formed on the surface of the substrate 2 for the purpose of preventing reflection of visible light, the reflectance of which needs to be reduced. The antireflection structure 3 may be embodied as an element which completely prevents the reflection of a luminous flux, the reflectance of which needs to be reduced; and may also be embodied as an element which prevents the reflection of a predetermined wavelength component of a luminous flux, the reflectance of which needs to be reduced.

Figure 3A:
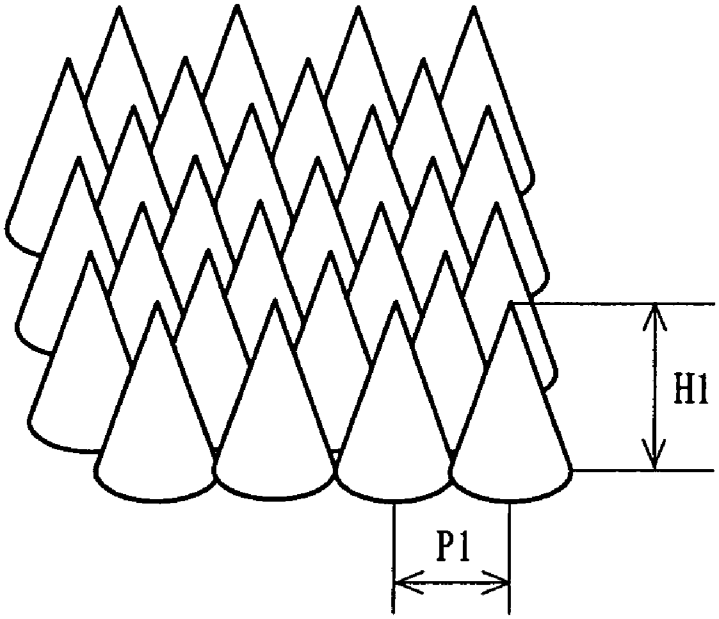
FIG. 3A is an enlarged schematic view of an example of an antireflection substrate 3 which includes conical structure elements.

FIG. 3A is a schematic enlarged view of an example of the antireflection structure 3 usable for this embodiment. The structure elements shown in FIG. 3A are each a cone-shaped protrusion having height H1, and are put in an array periodically at pitch P1.

Pitch P1 of the structure elements is substantially constant in one direction of arrangement throughout the entirety of the antireflection structure 3. Pitch P1 only needs to be smaller than a wavelength of visible spectrum. Preferably, pitch P1 is equal to or smaller than ½ of the wavelength of visible spectrum, and more preferably equal to or smaller than ⅓ of the wavelength of visible spectrum, in order to further reduce the dependency of the transmission/reflection characteristic, at an interface with air, on the angle of incidence and the wavelength. In addition, in consideration of productivity of the antireflection structure 3 as, for example, described later, pitch P1 preferably has a sufficient length. Usually, it is preferable that pitch P1 is, for example, equal to or greater than about 1/10 of the wavelength of visible spectrum. More preferably, pitch P1 is equal to or smaller than ½ of the lowest wavelength of visible spectrum, and further preferably is equal to or smaller than ⅓ of the lowest wavelength of visible spectrum. Usually, it is preferable that pitch P1 is, for example, equal to or greater than about 1/10 of the wavelength of visible spectrum.

There is no specific limitation on height H1 of the structure elements. It is not necessary that all the structure elements have an equal height H1 throughout the entirety of the antireflection structure 3. As height H1 is greater, the reflection prevention function with respect to visible light is advantageously raised. Accordingly, height H1 of the structure elements is preferably equal to or greater than pitch P1 (the height of the lowest structure element is equal to or greater than pitch P1), and is more preferably equal to or greater than three times pitch P1 (the height of the lowest structure element is equal to or greater than three times pitch P1). Again, in consideration of productivity of the antireflection structure 3 as, for example, described later, it is not preferable that height H1 is excessively large. Usually, it is preferable that height H1 is, for example, equal to or smaller than about five times pitch P1 (the height of the highest structure element is equal to or smaller than five times pitch P1).

In this embodiment, as described above, the structure including, for example, conical structure elements (FIG. 3A) is usable as the antireflection structure 3. In this case, the antireflection structure 3 may include, for example, conical structure elements having a height of 0.15 μm which are arranged at a pitch of 0.15 μm. Such structure elements correspond to structure elements which are arranged at a pitch which is equal to or smaller than ½ of a wavelength of visible spectrum (400 nm to 700 nm) and have a height which is equal to or greater than such a pitch.

Figure 3B:
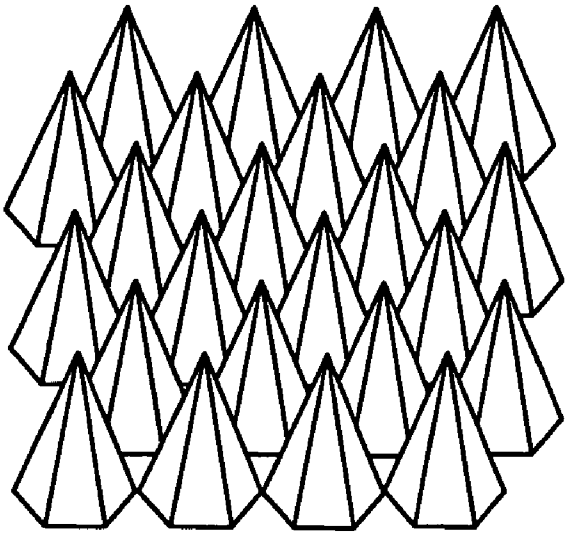
FIG. 3B is an enlarged schematic view of an example of the antireflection substrate 3 which includes pyramid-shaped structure elements.
Figure 4A:
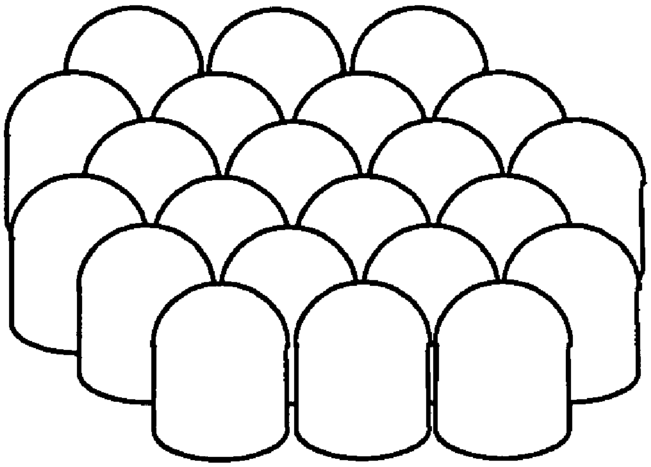
FIG. 4A is an enlarged schematic view of an example of the antireflection substrate 3 which includes hanging bell-shaped structure elements.
Figure 4B:
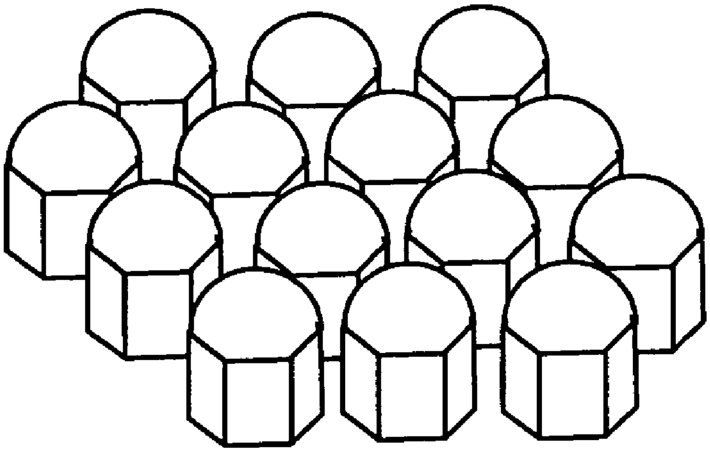
FIG. 4B is an enlarged schematic view of an example of the antireflection substrate 3 which includes hanging bell-shaped structure elements.
Figure 5A:
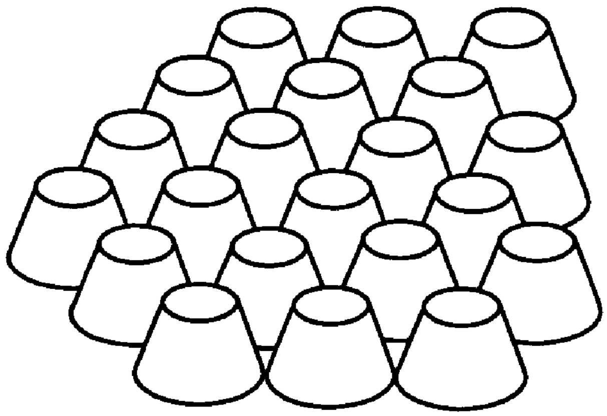
FIG. 5A is an enlarged schematic view of an example of the antireflection substrate 3 which includes truncated cone-shaped structure elements.
Figure 5B:
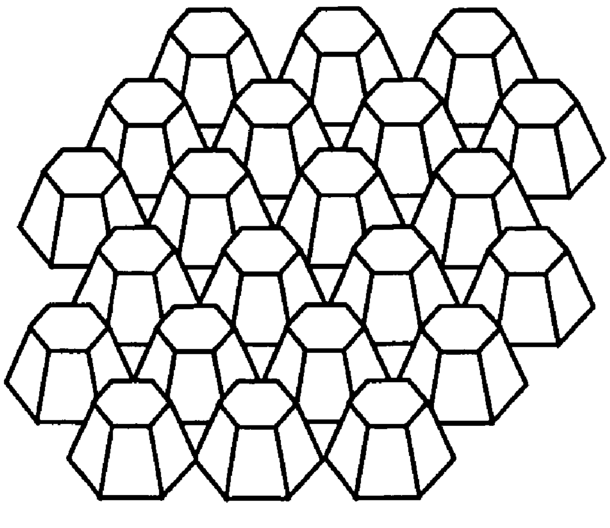
FIG. 5B is an enlarged schematic view of an example of the antireflection substrate 3 which includes truncated pyramid-shaped structure elements.

The antireflection structure 3 is not limited to including the conical structure elements shown in FIG. 3A. Alternatively, the antireflection structure 3 may include pyramid-shaped structure elements (FIG. 3B), for example, regular hexagonal pyramid-shaped structure elements or tetragonal pyramid-shaped structure elements. The structure elements are not limited to being conical or pyramid-shaped, and may be hanging bell-shaped with a round top (FIG. 4A and FIG. 4B), truncated cone-shaped (FIG. 5A) or truncated pyramid-shaped (FIG. 5B). The structure elements do not need to have a precisely uniform geometric shape, and are only needed to be substantially conical, pyramid-shaped, hanging bell-shaped, truncated cone-shaped or truncated pyramid-shaped, for example.

There is no specific limitation on the production method of the substrate 2 including the antireflection structure 3. For example, the substrate 2 may be produced as follows. On a quartz glass substrate or the like, a pattern is drawn by means of electronic beam drawing or the like. Then, the quartz glass substrate is treated with dry etching or the like, thereby forming a master mold having highly precisely the same shape as that of the antireflection structure 3. Using the master mold, a glass material which is softened by heating is press-molded, thereby forming a glass mold for producing the antireflection structure 3. Using the glass mold, an acrylic resin or any other usable material is press-molded, thereby producing the antireflection structure 3. With such a method, the substrate 2 including the antireflection structure 3 in at least a part thereof can be mass-produced at low cost. The thickness of the acrylic resin material to be press-molded is preferably equal to or greater than 0.05 mm.

When a third party contacts the contact detection sensor in this embodiment described above, and as a result, sebum, perspiration, stain or the like on the skin adheres to the antireflection structure, the reflectance of the antireflection structure increases. Thus, it can be easily distinguished visually whether a third party contacted the contact detection sensor or not.

In the above description, the contact detection sensor is provided on at least a part of a surface of a magnetic card. The target of detection, on which the contact detection sensor is to be pasted (hereinafter, referred to as a "detection target"), is not limited to a magnetic card, and may be anything which needs to be detected as having been contacted by a third party. The detection target maybe, for example, a banknote, a health insurance card, securities, or a letter or the like including highly confidential information. The detection target may be a safekeeping holder for keeping the magnetic, card, the banknote or the like.

When a third party contacts the contact detection sensor provided on a detection target, the reflectance of the antireflection structure increases by adhesion of sebum or the like. Therefore, the owner of the detection target easily learns that a third party contacted the detection target. Since the owner notices the theft in a short time, use of the banknote or the like can be suspended quickly. In this way, monetary damages such as withdrawal of cash can be prevented. For producing a contact detection sensor for the purpose of detecting a contact by a third party, the substrate is preferably formed of a material which is hard to see and is not conspicuous; for example, a transparent material such as an acrylic resin, a polycarbonate resin, a polyethylene terephthalate resin or the like.

In the above description, the contact detection sensor is used for the purpose of detecting a contact by a third party. The use of the contact detection sensor is not limited to this. For example, a contact detection sensor according to the present invention can be used for the purpose of objectively proving that the detection target has not been contacted by a third party. As described above, illegal acts such as providing false representation of the place of origin of food have recently become a serious issue. A contact detection sensor according to the present invention provided on the detection target can be used to prove that no third party contacted the detection target, by demonstrating that the reflectance of the antireflection structure has not been changed. For such a use, the contact detection sensor may be placed on a product, such as food, which needs to be proved as not having been contacted by a third party. Like in the case where the contact detection sensor is used for detecting a contact by a third party, the detection target is not limited to a product such as food, and may be a banknote, a health insurance card, securities, a magnetic card, or a safekeeping holder for keeping the magnetic card, the banknote or the like.

The reflectance of the antireflection structure included in the substrate is easily changed by sebum or the like adhering thereto. Therefore, until the contact detection sensor is used, it is preferable to cover a surface of the contact detection sensor with a protection film (not shown) to prevent sebum or the like from adhering thereto. The protection film maybe, for example, a flat smooth paper impregnated with a wax component such as paraffin or the like. Use of the protection film allows the user to handle the contact detection sensor with bare hands without spoiling the contact detection function thereof.

Figure 6:
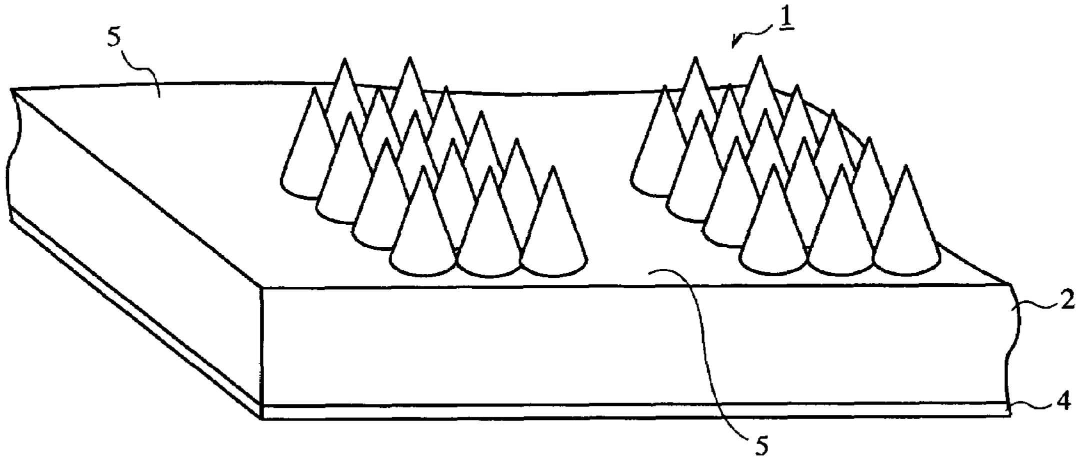
FIG. 6 is a schematic perspective view of the contact detection sensor 1 having a flat area 5.

The surface of the substrate may have a generally flat area on which the antireflection structure is not provided (hereinafter, referred to as a "flat area"). FIG. 6 is a schematic perspective view of the contact detection sensor 1 having a flat area 5. The user pastes the contact detection sensor on the detection target while holding the flat area of the substrate 2. Thus, the user can handle the contact detection sensor 1 without spoiling the contact detection function thereof.

Figure 7A:
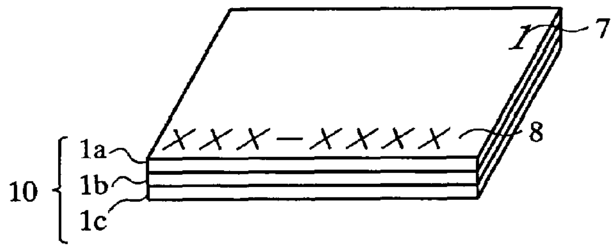
FIG. 7A is a schematic perspective view of a plurality of contact detection sensors provided in a stacked manner.

In the above description, a single contact detection sensor is used. Alternatively, a plurality of contact detection sensors may be used in a stacked manner. FIG. 7A is a schematic perspective view of a plurality of contact detection sensors provided in a stacked manner. As shown in FIG. 7A, three contact detection sensors 1*a* through 1*c* may be stacked in a releasable state to form one stacking-type contact detection sensor 10. In FIG. 7A, one stacking-type contact detection sensor 10 includes three contact detection sensors, but one stacking-type contact detection sensor may include two contact detection sensors or four or more contact detection sensors.

Figure 7B:
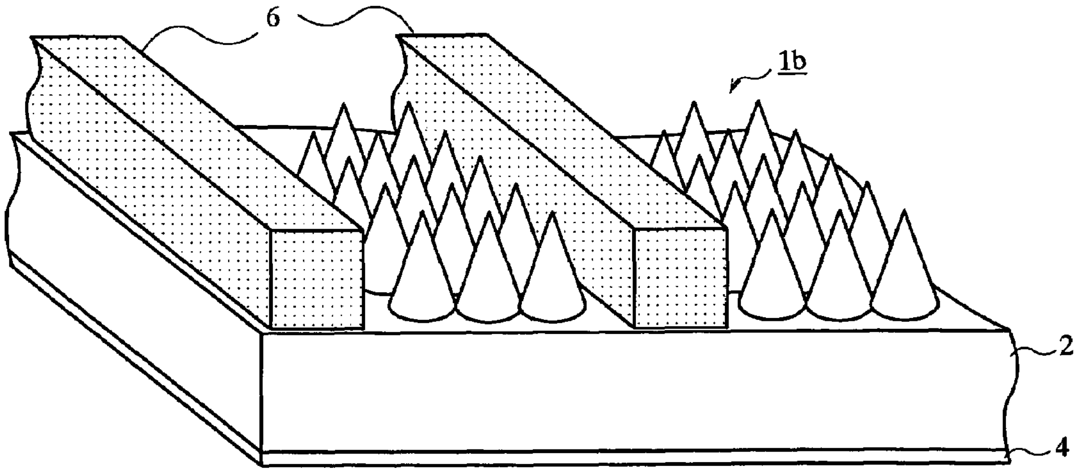
FIG. 7B is an enlarged schematic perspective view of one of the plurality of contact detection sensors, 1*b*, shown in FIG. 7A.

FIG. 7B is an enlarged schematic perspective view of one of the contact detection sensors, 1*b*, shown in FIG. 7A. As shown in FIG. 7B, spacers 6 are provided on the flat area 5 on which the antireflection structure is not provided. The spacers 6 are supporting members used for stacking the contact detection sensors. The height of each spacer 6 is equal to or greater than height H1 of the antireflection structure. The spacers 6 allow the contact detection sensors to be stacked without damaging the antireflection structure. On the uppermost contact detection sensor (the contact detection sensor 1*a* in the example shown in FIG. 7A), it is not necessary to provide spacers 6. The contact detection sensor 1*c* has the same structure as that of the contact detection sensor 1*b*. The spacers 6 may be an adhesive for bonding each substrate 2 and the adhesion layer 4 of the overlying contact detection sensor.

When the stacking-type contact detection sensor 10 as described above is used, used contact detection sensors 1 can be released sequentially from the uppermost contact detection sensor 1. The contact detection function can be easily reproduced without pasting another contact detection sensor 1. In this way, the contact detection function can be reproduced efficiently without replacement of the contact detection sensors 1.

When the stacking-type contact detection sensor is used, it is necessary to release the adhesion layer 4 of each contact detection sensor from the substrate 2 of the underlying contact detection sensor. Therefore, it is preferable that the surface of the substrate, from which the adhesion layer 4 is to be released, is treated with a silicone-based release agent or the like. This allows the adhesion layer 4 of one contact detection sensor to be released from the substrate 2 of the underlying contact detection sensor without damaging the antireflection structure. Alternatively, the adhesion layer 4 may be formed of a releasable adhesion material.

When the stacking-type contact detection sensor is used, it is preferable to put a mark 7 to each contact detection sensor 1 such that each contact detection sensor 1 is identifiable (FIG. 7A). In this way, after one contact detection sensor is released, the number of the remaining contact detection sensors can be correctly recognized. It is more preferable to put a mark 8 to the stacking-type contact detection sensor such that the stacking-type contact detection sensor is identifiable. This prevents a third party from replacing the entire stacking contact detection sensor with another stacking contact detection sensor.

Second Embodiment

Figure 8:
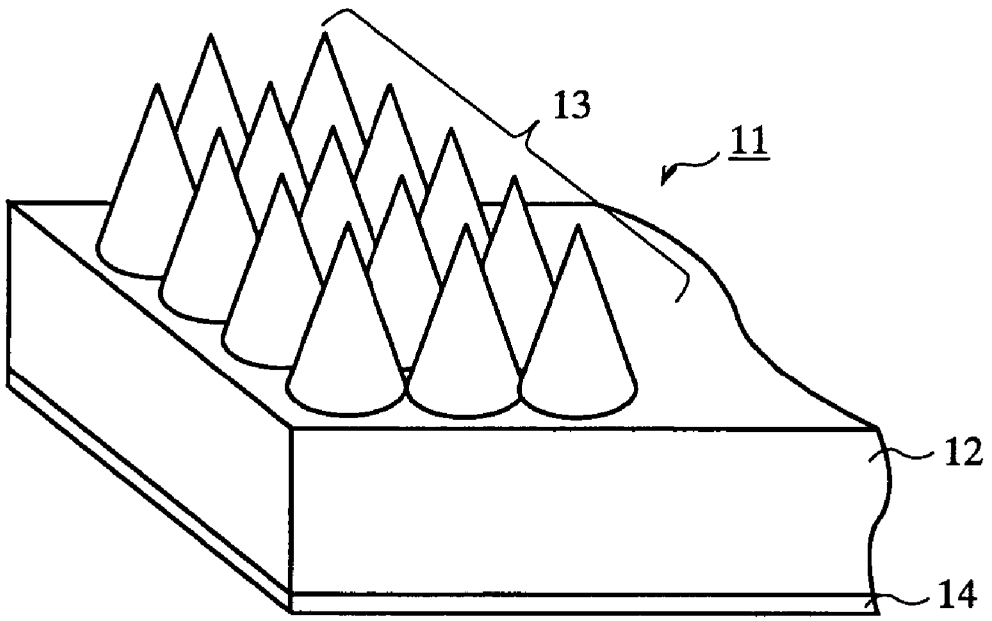
FIG. 8 is an enlarged schematic perspective view of a contact detection sensor 11 according to a second embodiment of the present invention.

A contact detection sensor according to a second embodiment of the present invention has a feature of being tape-like. FIG. 8 is an enlarged schematic perspective view of a contact detection sensor 11 according to the second embodiment of the present invention.

The contact detection sensor 11 shown in FIG. 8 includes a substrate 12 and an adhesion layer 14. The substrate 12 includes an antireflection structure 13 in at least a part of a surface portion thereof. The substrate 12 is like a tape having a size of, for example, 10 mm (width)×0.05 mm (thickness). Like in the first embodiment, the substrate 12 is formed of a transparent material such as an acrylic resin, a polycarbonate resin, a polyethylene terephthalate resin or the like. The substrate 12 may have any thickness which allows the substrate 12 to be easily handled and provides a sufficient mechanical strength. Preferably, the thickness of the substrate 12 is equal to or greater than 0.05 mm.

The substrate 12, the antireflection structure 13, and the adhesion layer 14 in this embodiment respectively correspond to the substrate 2, the antireflection structure 3, and the adhesion layer 4 in the first embodiment. The contact detection sensor 11 in this embodiment is substantially the same as the contact detection sensor 1 in the first embodiment except that the contact detection sensor 11 is tape-like.

The height and pitch of the antireflection structure 13 may be determined in substantially the same manner as in the first embodiment. For example, conical structure elements having a height of 0.15 μm may be put in an array at a pitch of 0.15 μm. There is no specific limitation on the production method of the substrate 12 including the antireflection structure 13. For example, the substrate 12 may be produced in substantially the same manner as in the first embodiment.

The contact detection sensor in this embodiment is tape-like as described above. Therefore, the contact detection sensor can be cut by a necessary length in accordance with the detection target on which the contact detection sensor is to be pasted. The contact detection sensor, which can be cut by a desired length, can be pasted on a small area. In addition, the tape-like contact detection sensor can be rolled while having a surface thereof covered with a protection film (not shown), and kept as mounted on a tape holder.

Figure 9A:
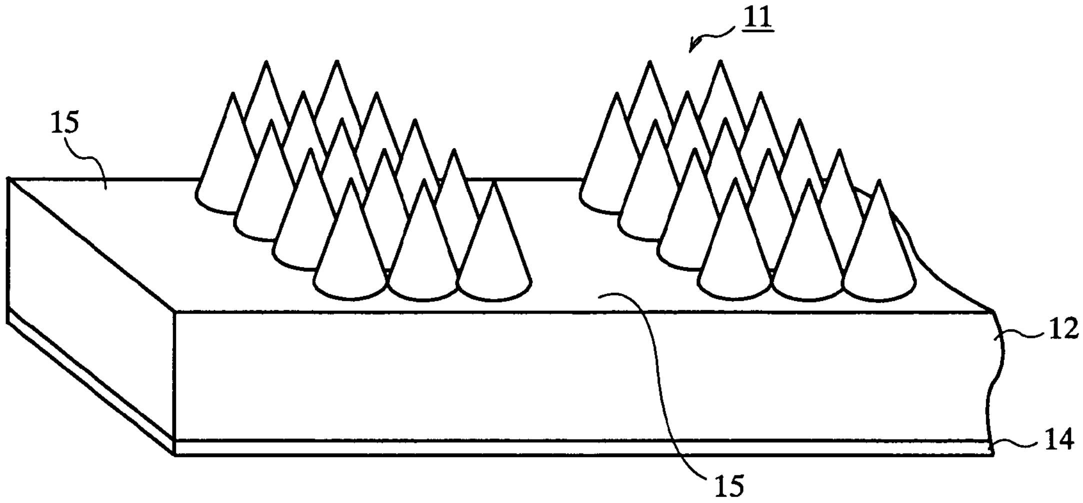
FIG. 9A is a schematic perspective view of the contact detection sensor 11 having a flat area 15.

A surface of the substrate in this embodiment may have a flat area 15 like in the first embodiment (FIG. 9A). This allows the user to handle the contact detection sensor without spoiling the contact detection function thereof.

Figure 9B:
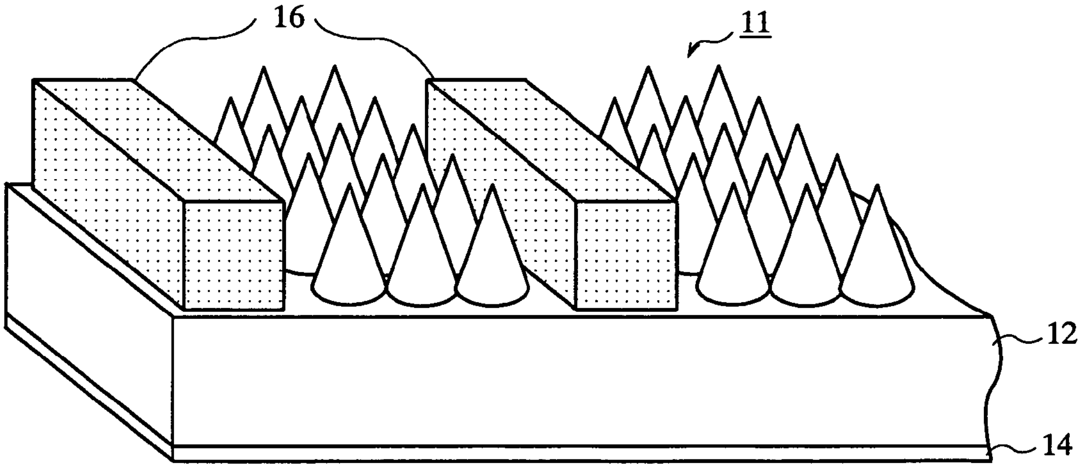
FIG. 9B is a schematic perspective view of the contact detection sensor 11 including spacers 16.

In this embodiment, a plurality of contact detection sensors may be used in a stacked manner in a releasable state like in the first embodiment. In this case, it is preferable to provide spacers 16 on the surface of the substrate like in the first embodiment (FIG. 9B).

Third Embodiment

In the first and second embodiments, the antireflection structure of the contact detection sensor has the structure elements protruding from the surface of the substrate. The structure elements of the antireflection structure are not limited to having such a shape. For example, the structure elements of the antireflection structure may be recesses. In a contact detection sensor according to a third embodiment of the present invention, the structure elements of the antireflection structure included in the substrate has a feature of being recesses.

Figure 10:
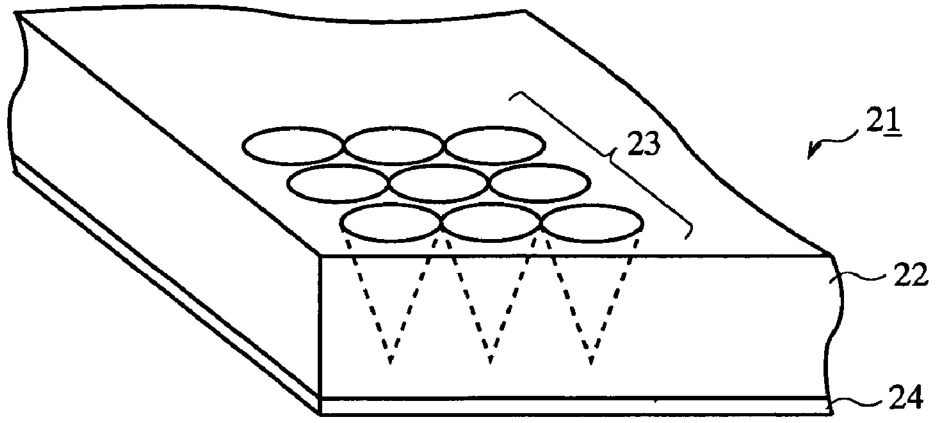
FIG. 10 is an enlarged schematic perspective view of a contact detection sensor 21 according to a third embodiment of the present invention.

FIG. 10 is an enlarged schematic perspective view of a contact detection sensor 21 according to the third embodiment of the present invention. The contact detection sensor 21 shown in FIG. 10 includes a substrate 22 and an adhesion layer 24. The substrate 22 includes an antireflection structure 23 in at least a part of a surface portion thereof. The substrate 22 is a sheet having a size of, for example, 10 mm×20 mm×0.05 mm. Like in the first example, the substrate 22 is formed of a transparent material such as an acrylic resin, a polycarbonate resin, a polyethylene terephthalate resin or the like. The substrate 22 may have any thickness which allows the substrate 22 to be easily handled and provides a sufficient mechanical strength. Preferably, the thickness of the substrate 22 is equal to or greater than 0.05 mm.

The substrate 22, the antireflection structure 23, and the adhesion layer 24 in this embodiment respectively correspond to the substrate 2, the antireflection structure 3, and the adhesion layer 4 in the first embodiment. The contact detection sensor 21 in this embodiment is substantially the same as the contact detection sensor 1 in the first embodiment except that the antireflection structure 23 is recessed. Accordingly, the difference of the contact detection sensor 21 from the contact detection sensor 1 will be mainly described below, and the materials of the substrate 22 and the adhesion layer 24, conceivable embodiments of the antireflection structure 23 and the like will not be described in detail.

Figure 11:
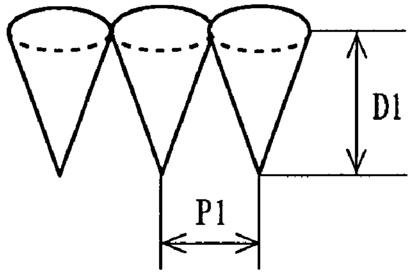
FIG. 11 shows an antireflection structure 23 provided in a substrate 22 shown in FIG. 10.

FIG. 11 shows the antireflection structure 23 included in the substrate 22 shown in FIG. 10. For example, the antireflection structure 23 usable for this embodiment includes structure elements which are conical holes recessed by depth D1 and put in an array periodically at pitch P1 as shown in FIG. 11. Depth D1 of the recessed holes corresponds to height H1 in the first embodiment. By putting structure elements having a predetermined shape in an array periodically in this manner, the apparent refractive index with respect to visible light can be continuously changed. As a result, an antireflection surface can be formed which has a transmission/reflection characteristic, at an interface with air, which has less dependency on the angle of incidence and less dependency on the wavelength.

There is no specific limitation on depth D1 of the structure elements. It is not necessary that all the structure elements have an equal depth D1 throughout the entirety of the antireflection structure 23. As depth D1 is greater, the reflection prevention function with respect to visible light is advantageously raised. Accordingly, depth D1 of the structure elements is preferably equal to or greater than pitch P1 (the depth of the shallowest structure element is equal to or greater than pitch P1), and is more preferably equal to or greater than three times pitch P1 (the depth of the shallowest structure element is equal to or greater than three times pitch P1). Again, in consideration of productivity of the antireflection structure 23 as, for example, described later, it is not preferable that depth D1 is excessively large. Usually, it is preferable that depth D1 is equal to or smaller than about five times pitch P1 (the depth of the deepest structure element is equal to or smaller than five times pitch P1).

In this embodiment, as described above, the structure including, for example, conical structure elements (FIG. 11) is usable as the antireflection structure 23. In this case, the antireflection structure 23 may include, for example, conical structure elements having a depth of 0.15 μm which are arranged at a pitch of 0.15 μm. Such structure elements correspond to structure elements which are arranged at a pitch which is equal to or smaller than ½ of a wavelength of visible spectrum (400 nm to 700 nm) and have a depth which is equal to or greater than such a pitch.

The antireflection structure 23 is not limited to including the conical structure elements shown in FIG. 11. Alternatively, the antireflection structure 23 may include pyramid-shaped structure elements, for example, regular hexagonal pyramid-shaped structure elements or tetragonal pyramid-shaped structure elements. The structure elements are not limited to having a conical or pyramid shape, and may be hanging bell-shaped with a round top, truncated cone-shaped or truncated pyramid-shaped. The structure elements do not need to have a precisely uniform geometric shape, and are only needed to be substantially conical, pyramid-shaped, hanging bell-shaped, truncated cone-shaped or truncated pyramid-shaped, for example.

There is no specific limitation on the production method of the substrate 22 including the antireflection structure 23. For example, the substrate 22 may be produced as follows. On a quartz glass substrate or the like, a pattern is drawn by means of electronic beam drawing or the like. Then, the quartz glass substrate is treated with dry etching or the like, thereby forming a master mold having highly precisely the same shape as that of the antireflection structure 23. Using the master mold, a glass material which is softened by heating is press-molded, thereby forming a glass mold for producing the antireflection structure 23. Using the glass mold, an acrylic resin or any other usable material is press-molded, thereby producing the antireflection structure 23. With such a method, the substrate 22 including the antireflection structure 23 in at least a part thereof can be mass-produced at low cost. The thickness of the acrylic resin material to be press-molded is preferably equal to or greater than 0.05 mm.

As described above, with the contact detection sensor in this embodiment in which the structure elements of the antireflection structure are recesses, when sebum adheres to the antireflection structure of the contact detection sensor, the reflectance of the antireflection structure increases, like in the first embodiment. Thus, it can be easily distinguished visually whether a third party contacted the contact detection sensor or not. By the contact detection sensor pasted on the detection target, a contact by a third party can be easily detected.

The reflectance of the antireflection structure included in the substrate is easily changed by sebum or the like adhering thereto. Therefore, until the contact detection sensor is used, it is preferable to cover a surface of the contact detection sensor with a protection film (not shown) to prevent sebum or the like from adhering thereto. Use of the protection film allows the user to handle the contact detection sensor with bare hands without spoiling the contact detection function thereof.

Figure 12A:
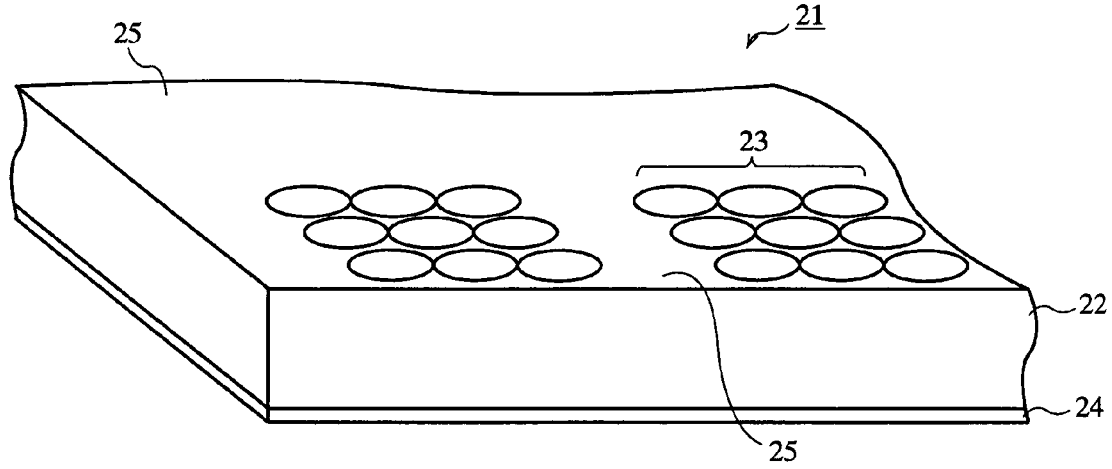
FIG. 12A is a schematic perspective view of the contact detection sensor 21 having a flat area 25.

Like in the first embodiment, a surface of the substrate in this embodiment may have a flat area 25 (FIG. 12A). This allows the user to handle the contact detection sensor 21 without spoiling the contact detection function thereof.

Figure 12B:
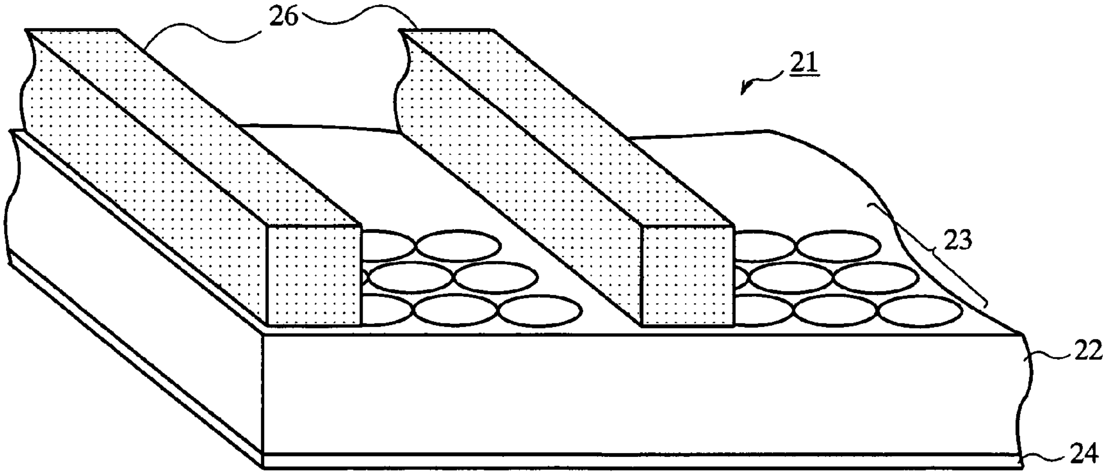
FIG. 12B is a schematic perspective view of the contact detection sensor 21 including spacers 26.

In this embodiment, a plurality of contact detection sensors may be used in a stacked manner in a releasable state like in the first embodiment. Again like in the first embodiment, spacers 26 are preferably provided on the surface of the substrate (FIG. 12B).

In the above, the antireflection structure 23 having recessed conical holes as the structure elements has been mainly described. The structure elements of the antireflection structure is not limited to being conical. For example, the antireflection structure may include, as structure elements, pyramid-shaped, hanging bell-shaped, truncated cone-shaped, or truncated pyramid-shaped holes which are recessed from the surface of the substrate and put in an array periodically at a pitch smaller than a wavelength of visible spectrum. Alternatively, one antireflection structure may include both protruding structure elements and recessed structure elements. In such a structure, it is preferable that the sum of the height of the protruding structure elements and the depth of the recessed structure elements is within the range described above regarding height H1. As can be appreciated from these examples, there is no specific limitation on the shape or the like of the structure elements of the antireflection structure, as long as the structure elements are put in an array periodically at a pitch smaller than a wavelength of visible spectrum and thus reflection of unnecessary light is sufficiently prevented.

Fourth Embodiment

Figure 13:
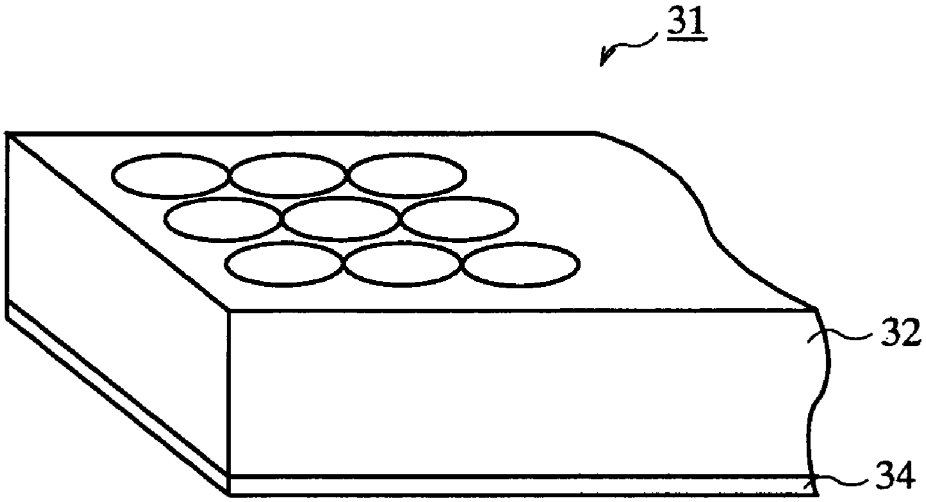
FIG. 13 is an enlarged schematic perspective view of a contact detection sensor 31 according to a fourth embodiment of the present invention.

A contact detection sensor according to a fourth embodiment of the present invention has a feature of being tape-like. FIG. 13 is an enlarged schematic perspective view of a contact detection sensor according to the fourth embodiment of the present invention.

The contact detection sensor 31 shown in FIG. 13 includes a substrate 32 and an adhesion layer 34. The substrate 32 includes an antireflection structure 33 in at least a part of a surface portion thereof. The substrate 32 is like a tape having a size of, for example, 10 mm (width)×0.05 mm (thickness). Like in the first embodiment, the substrate 32 is formed of a transparent material such as an acrylic resin, a polycarbonate resin, a polyethylene terephthalate resin or the like. The substrate 32 may have any thickness which allows the substrate 32 to be easily handled and provides a sufficient mechanical strength. Preferably, the thickness of the substrate 32 is equal to or greater than 0.05 mm.

The substrate 32, the antireflection structure 33, and the adhesion layer 34 in this embodiment respectively correspond to the substrate 22, the antireflection structure 23, and the adhesion layer 24 in the third embodiment. The contact detection sensor 31 in this embodiment is substantially the same as the contact detection sensor 21 in the third embodiment except that the contact detection sensor 31 is tape-like.

The depth and pitch of the antireflection structure 33 may be determined in substantially the same manner as in the third embodiment. For example, conical structure elements having a depth of 0.15 μm may be put in an array at a pitch of 0.15 μm. There is no specific limitation on the production method of the substrate 32 including the antireflection structure 33. For example, the substrate 32 may be produced in substantially the same manner as in the third embodiment.

The contact detection sensor in this embodiment is tape-like as described above. Therefore, the contact detection sensor can be cut by a necessary length in accordance with the detection target on which the contact detection sensor is to be pasted. The contact detection sensor, which can be cut by a desired length, can be pasted on a small area. In addition, the tape-like contact detection sensor can be rolled while having a surface thereof covered with a protection film (not shown), and kept as mounted on a tape holder.

Figure 14A:
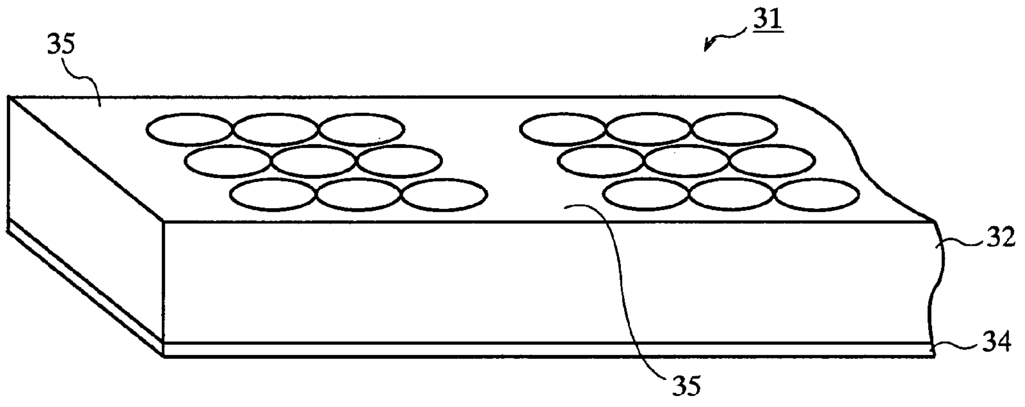
FIG. 14A is a schematic perspective view of the contact detection sensor 31 having a flat area 35.

A surface of the substrate in this embodiment may have a flat area 35 like in the first embodiment (FIG. 14A). This allows the user to handle the contact detection sensor without spoiling the contact detection function thereof.

Figure 14B:
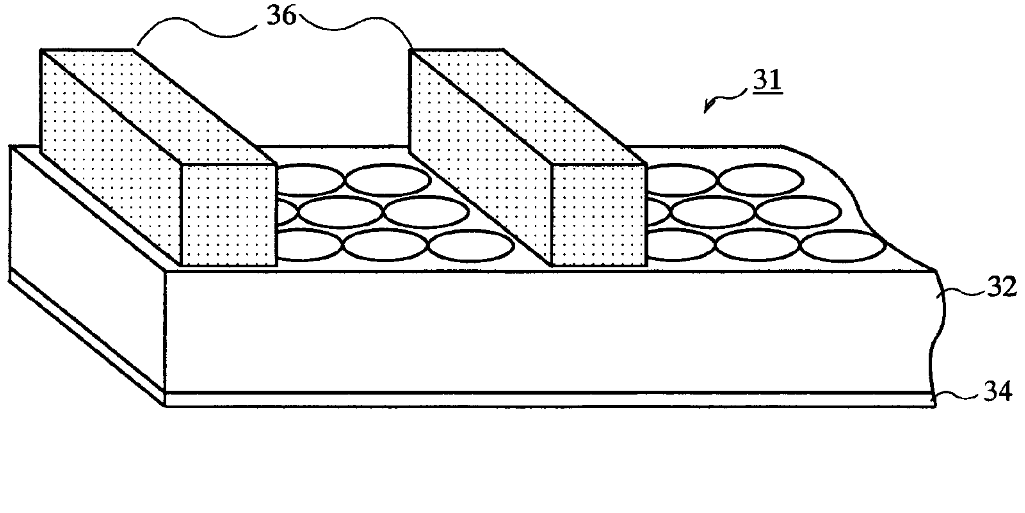
FIG. 14B is a schematic perspective view of the contact detection sensor 31 including spacers 36.

In this embodiment, a plurality of contact detection sensors may be used in a stacked manner in a releasable state like in the first embodiment. In this case, it is preferable to provide spacers 36 on the surface of the substrate like in the first embodiment (FIG. 14B).

In the first through fourth embodiments, the substrate of the contact detection sensor is formed of a transparent material. The substrate is not limited to being formed of a transparent material. The present invention is not limited to this. As described above, a contact detection sensor including a substrate formed of a transparent material can detect contact on a detection target without being noticed by a third party. However, the substrate may be formed of an opaque material such as a polyolefin-based white material or the like or a black material. For example, a substrate formed of a black material can be obtained by incorporating a black dye (e.g., Plast Black 8950, Plast Black 8970; both are trade names; produced by Arimoto Chemical Co., Ltd.) which is obtained by mixing, for example, cyan, magenta, and yellow colorants, or a pigment such as carbon black, to a resin such as an acrylic resin, a polycarbonate resin, a polyethylene terephthalate resin or the like. A substrate formed of a black material has an effect of improving the contrast between an area having sebum or the like adhering thereto and an area with no sebum, in addition to the effect provided by using an opaque material. This makes it still easier to detect a contact by a third party.

Even in the case where the existence of the contact detection sensor is to be concealed, it is not absolutely necessary that the substrate is formed of a transparent material. In this case, however, the substrate is preferably formed of a material having the same color as, a same-hue color as, or an analogous color to, the color of the detection target.

A substrate formed of a conspicuous color has an effect of intimidating a third party since it is clear that the contact detection sensor is attached to the detection target. Therefore, such a substrate prevents the third party from contacting the detection target. In the case where the existence of the contact detection sensor is to be easily noticed, the substrate is preferably formed of a material having the opponent color to, or a near complementary color to, the color of the detection target. "Opponent colors" is also referred to as "complementary colors" and refers to two colors which become an achromatic color when mixed together. Complementary colors are, for example, white and black, yellow and blue, and red and bluish green. In a color circle, a "near complementary color" of a certain color is positioned next to the opponent color which is located diagonal with respect to the certain color. For example, with respect to "red", "green" which is located diagonal to red in the six-color circle is the opponent color, "orange" and "purple" located next to red are analogous colors, and "yellow" and "blue" are near complementary colors. The color of the substrate is not limited to the opponent color or a near complementary color to the color of the detection target, and may be an eye-attracting sign color such as red or green. The color of the substrate may also be a conspicuous color, such as a color having a high chroma or brightness, or an eye-attracting color such as a primary color or a fluorescent color.

In the first through fourth embodiments, the pitch of the antireflection structure is smaller than a wavelength of visible spectrum. The pitch and height of the antireflection structure may be appropriately determined in accordance with the color of the substrate or the color of the detection target on which the contact detection sensor is to be pasted. When, for example, the substrate is red, the pitch is preferably smaller than 640 nm to 770 nm. When the substrate is blue, the pitch is preferably smaller than 430 nm to 490 nm. When the substrate is formed of a transparent material, the pitch may be determined in accordance with the color of the detection target on which the contact detection sensor is to be pasted. When, for example, the detection target is green, the pitch is preferably smaller than 490 nm to 550 nm. When the detection target is yellow, the pitch is preferably smaller than 550 nm to 590 nm.

In the first through fourth embodiments, the substrate of the contact detection sensor is formed of a resin. The material of the substrate is not limited to a resin, and may be, for example, a metal such as aluminum, brass, stainless steel or copper, or an alloy. In the first through fourth embodiments, an adhesion layer is provided on the rear surface of the substrate. It is not absolutely necessary that the contact detection sensor includes an adhesion layer, and the substrate may be pasted on the detection target with an adhesion agent or the like.

In the first through fourth embodiments, the contact detection sensor is pasted on the detection target. Alternatively, the antireflection structure of the contact detection sensor may be provided on a substrate of the detection target. With such a structure, the substrate of the contact detection sensor constitutes a part of the surface of the detection target, and thus the contact detection sensor can be integrally formed with the detection target. Therefore, the detection target can be provided with a contact detection function without the contact detection sensor being pasted.

In the first through fourth embodiments, the contact detection sensor is mainly used for the purpose of checking if a third party contacted the detection target. The contact detection sensor may be used for other purposes as follows. For example, letters can be written or simple drawings can be made on the surface of the contact detection sensor 1 by touching the surface with a finger.

As described above, the present invention provides an effective low-cost contact detection sensor and method for detecting contact by a third party.

While the invention has been described in detail, the foregoing description is in all aspects illustrative and not restrictive. It is understood that numerous other modifications and variations can be devised without departing from the scope of the invention.

What is claimed is:

1. A contact detection sensor for distinguishing whether a detection target is contacted by a human body or not, the sensor comprising:

an antireflection structure including structure elements having a predetermined shape which are put in an array periodically at a pitch smaller than a wavelength of visible spectrum; and a substrate including the antireflection structure in at least a part of a surface portion thereof;

wherein the antireflection structure distinguishes whether the detection target is contacted by a human body or not based on a change in reflectance which occurs to an area of the detection target contacted by the human body when the detection target is contacted by the human body.

2. A contact detection sensor according to claim 1, wherein the substrate constitutes at least a part of a surface of the detection target.

3. A contact detection sensor according to claim 1, wherein the substrate is sheet-like.

4. A contact detection sensor according to claim 3, further comprising an adhesion layer provided on a rear surface of the substrate for bonding the substrate and the detection target.

5. A contact detection sensor according to claim 3, wherein the substrate has a generally flat area on at least a part of a surface thereof.

6. A contact detection sensor according to claim 3, wherein the substrate has the same color as, a same hue color as, or an analogous color to, the color of the detection target.

7. A contact detection sensor according to claim 3, wherein the substrate has the opponent color to, or a near complementary color to, the color of the detection target.

8. A contact detection sensor according to claim 3, wherein a plurality of substrates each having the antireflection structure in at least a part of the surface portion thereof are stacked in a releasable state.

9. A contact detection sensor according to claim 8, wherein the plurality of substrates each have a mark for identifying the individual substrate.

10. A contact detection sensor according to claim 8, wherein the plurality of substrates have a mark for identifying the sensor of a stacking type.

11. A contact detection sensor according to claim 1, wherein the substrate is tape-like.

12. A contact detection sensor according to claim 11, further comprising an adhesion layer provided on a rear surface of the substrate for bonding the substrate and the detection target.

13. A contact detection sensor according to claim 11, wherein the substrate has a generally flat area on at least a part of a surface thereof.

14. A contact detection sensor according to claim 11, wherein the substrate has the same color as, a same hue color as, or an analogous color to, the color of the detection target.

15. A contact detection sensor according to claim 11, wherein the substrate has the opponent color to, or a near complementary color to, the color of the detection target.

16. A contact detection sensor according to claim 11, wherein a plurality of substrates each having the antireflection structure in at least a part of the surface portion thereof are stacked in a releasable state.

17. A contact detection sensor according to claim 16, wherein the plurality of substrates each have a mark for identifying the individual substrate.

18. A contact detection sensor according to claim 16, wherein the plurality of substrates have a mark for identifying the sensor of a stacking type.

19. A contact detection sensor according to claim 1, wherein the structure elements of the antireflection structure are generally conical or pyramid-shaped protrusions and/or generally conical or pyramid-shaped recesses.

20. A contact detection sensor according to claim 1, wherein the structure elements of the antireflection structure are arranged periodically in the array at a pitch which is equal to or smaller than ½ of the wavelength of visible spectrum.

21. A contact detection sensor according to claim 1, wherein the structure elements of the antireflection structure have a height or a depth which is equal to or greater than the pitch.

22. A contact detection sensor according to claim 1, wherein the structure elements of the antireflection structure have a height or a depth which is equal to or greater than three times the pitch.

23. A contact detection sensor according to claim 1, wherein a top surface or a bottom surface of the structure elements of the antireflection structure has a shape selected from the group consisting of a generally circular shape, a generally quadrangular shape, and a generally hexagonal shape.

24. A contact detection sensor according to claim 1, wherein the substrate is formed of a transparent material.

25. A contact detection sensor according to claim 1, wherein the substrate is formed of an opaque material.

26. A contact detection sensor according to claim 1, wherein the substrate is formed of a black material.

* * * * *

UNITED STATES PATENT AND TRADEMARK OFFICE

CERTIFICATE OF CORRECTION

PATENT NO. : 7,292,321 B2

APPLICATION NO. : 11/115384

DATED : November 6, 2007

INVENTOR(S) : Yoshiharu Yamamoto et al.

It is certified that error appears in the above-identified patent and that said Letters Patent is hereby corrected as shown below:

On the title page of the patent, in item "(56) References Cited", under "U.S. PATENT DOCUMENTS", please add --2005/0074579 04/07/2005 Suzuki et al.--.

Signed and Sealed this

Fourth Day of November, 2008

JON W. DUDAS

*Director of the United States Patent and Trademark Office*